(12) United States Patent
Wilf et al.

(10) Patent No.: US 10,798,055 B2
(45) Date of Patent: *Oct. 6, 2020

(54) DETECTING RELAYED COMMUNICATIONS

(71) Applicant: PAYPAL ISRAEL LTD., Tel Aviv (IL)

(72) Inventors: Saar Wilf, Tel Aviv (IL); Shvat Shaked, Jerusalem (IL)

(73) Assignee: PAYPAL ISRAEL LTD., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/182,555

(22) Filed: Nov. 6, 2018

(65) Prior Publication Data

US 2019/0182210 A1 Jun. 13, 2019

Related U.S. Application Data

(63) Continuation of application No. 14/630,494, filed on Feb. 24, 2015, now Pat. No. 10,122,683, which is a
(Continued)

(51) Int. Cl.
*H04L 29/12* (2006.01)
*H04L 12/24* (2006.01)
(Continued)

(52) U.S. Cl.
CPC .......... *H04L 61/2589* (2013.01); *H04L 41/12* (2013.01); *H04L 63/0281* (2013.01);
(Continued)

(58) Field of Classification Search
CPC ......... H04L 67/02; H04L 67/28; H04L 41/12; H04L 41/28; H04L 69/22; G06F 21/00
See application file for complete search history.

(56) References Cited

U.S. PATENT DOCUMENTS 5,892,903 A 4/1999 Klaus
6,452,915 B1 9/2002 Jorgensen
(Continued)

FOREIGN PATENT DOCUMENTS

WO WO 01/38999 5/2001
WO WO 03/063444 7/2003

OTHER PUBLICATIONS

Zalewski, M. p0f 2. "Dr. Jekyll had something to Hyde". passive OS fingerprinting tool. pp. 1-17. (Year: 2004).*
(Continued)

*Primary Examiner* — John M MacIlwinen
(74) *Attorney, Agent, or Firm* — Haynes and Boone, LLP

(57) ABSTRACT

Methods, apparatus and computer readable code for determining whether a potential relay device is a relay device are provided herein. In some embodiments, first and second information elements are received from a potential relay device, which is an original source of the second information element. In order to determine whether the potential relay device is a relay device, it is determined whether a feature of an original source of the first information element and a feature of the potential relay device are features unlikely to relate to a single device, wherein a positive result of the determining is indicative that the potential relay device is a relay device. In an exemplary embodiment, a disclosed system includes an information element receiver and a feature incompatibility analyzer. Optionally, the disclosed system includes a feature discovery module, a parameter obtainer and a feature database.

20 Claims, 7 Drawing Sheets

Related U.S. Application Data continuation of application No. 10/585,517, filed as application No. PCT/IL2005/000033 on Jan. 9, 2005, now Pat. No. 8,966,088.

(60) Provisional application No. 60/534,927, filed on Jan. 9, 2004.

(51) Int. Cl.
  *H04L 29/06* (2006.01)
  *H04L 29/08* (2006.01)

(52) U.S. Cl.
  CPC .......... *H04L 63/1441* (2013.01); *H04L 63/20* (2013.01); *H04L 67/02* (2013.01); *H04L 67/2814* (2013.01); *H04L 67/42* (2013.01); *H04L 63/126* (2013.01)

(56) References Cited

U.S. PATENT DOCUMENTS

| | | | |
|---|---|---|---|
| 6,496,824 B1 * | 12/2002 | Wilf | G06Q 20/085 705/52 |
| 6,519,568 B1 | 2/2003 | Harvey et al. | |
| 6,757,740 B1 * | 6/2004 | Parekh | G06Q 20/3224 709/245 |
| 7,360,245 B1 * | 4/2008 | Ramachandran | H04L 63/1466 713/153 |
| 2002/0032717 A1 | 3/2002 | Malan et al. | |
| 2003/0110274 A1 | 6/2003 | Pazi et al. | |
| 2005/0097049 A1 * | 5/2005 | Writer | G06Q 20/00 705/44 |

OTHER PUBLICATIONS

Arkin et al., "The Present and Future of Xprobe2: The Next Generation of Active Operating System Fingerprinting," Jul. 2003, 35 Pages.

Beverly, Robert, "A Robust Classifier for Passive TCP/IP Fingerprinting," MIT Computer Science and Artificial Intelligence Laboratory, Apr. 2004, pp. 158-167, Springer.

Lippman et al., "Passive Operating System Identification From TCP/IP Packet Headers," Workshop on Data Mining for Computer Security, Nov. 2003, pp. 40-49.

Treurniet, J., "An Overview of Passive Information Gathering Techniques for Network Security," Defence R&D Canada—Ottawa, May 2004, 50 Pages.

Zalewski, Michal, "Dr. Jekyll had something to Hyde," 2004, pp. 1-17.

\* cited by examiner

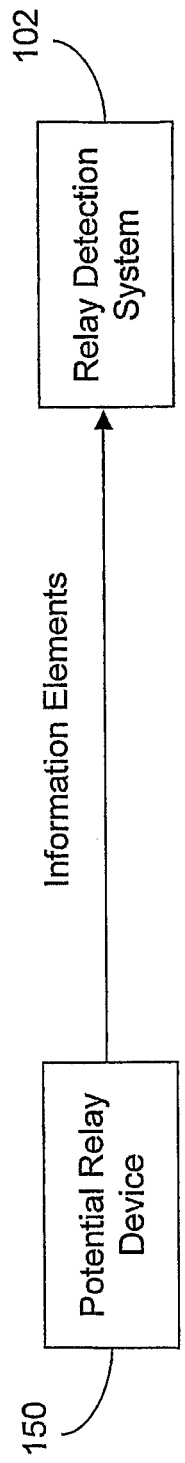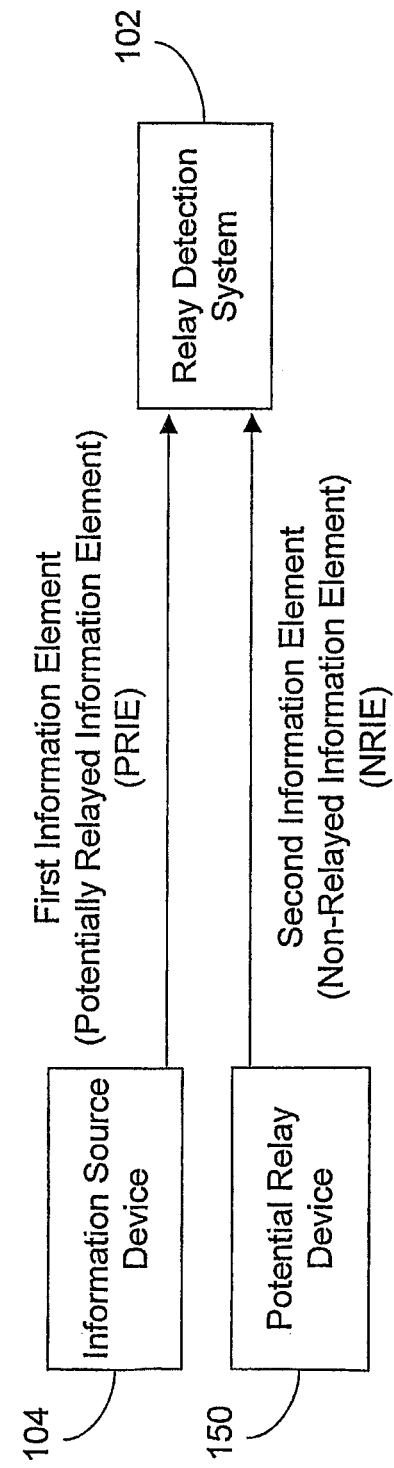

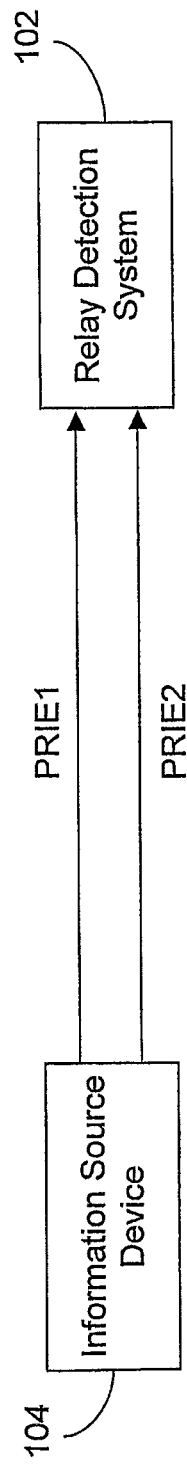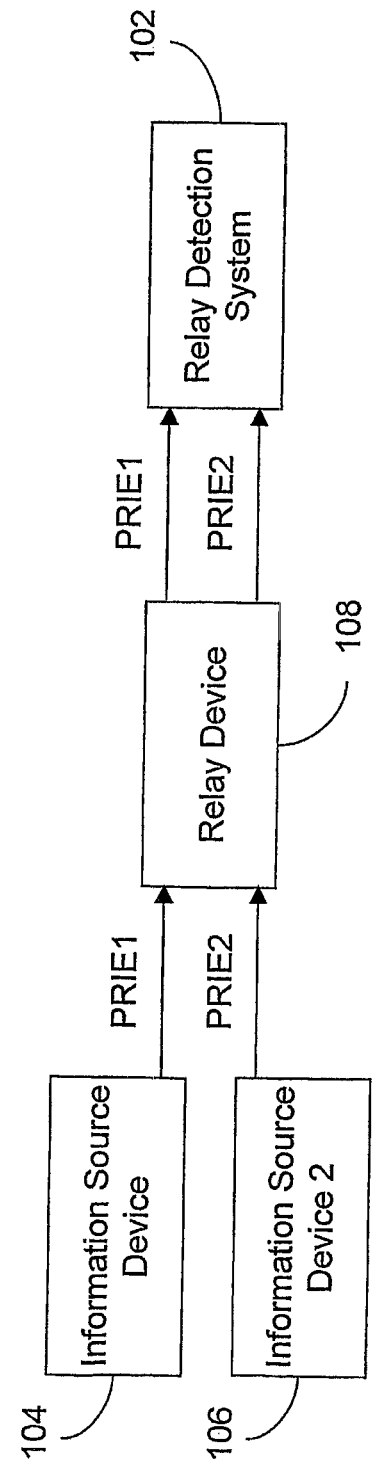

DETECTING RELAYED COMMUNICATIONS

CROSS REFERENCE TO RELATED APPLICATIONS

This application is a continuation of U.S. patent application Ser. No. 14/630,494, filed Feb. 24, 2015, which is a continuation of U.S. patent application Ser. No. 10/585,517, filed Jul. 10, 2006, now issued as U.S. Pat. No. 8,966,088, which is a National Stage entry of PCT/IL05/00033, filed Jan. 9, 2005, which claims priority to U.S. Provisional Application Ser. No. 60/534,927, filed Jan. 9, 2004, all of which are incorporated herein by reference in their entirety.

FIELD OF THE INVENTION

The present invention relates to methods, apparatus and computer readable code for detecting relayed communications.

BACKGROUND OF THE INVENTION

Relay devices are commonly used in many communication mediums and environments, and especially on the Internet. A relay device is a communication device that receives communications from a sender and forwards them to a receiver.

A relay device may be used in cases where direct communication between the sender and receiver is not possible, or to enhance the performance and security of various applications.

For example, users in a secure environment (e.g. a private corporate data network) may be prohibited from connecting directly to HTTP servers (see RFC 2616; for information about the RFC series of documents see the RFC Editor website at http://www.rfc-editor.org) on the public Internet. In such cases an HTTP proxy server may be installed in the secure network, and will be allowed to connect to outside HTTP servers. Users can then use the proxy to relay HTTP requests and responses to and from external HTTP servers. In this example, the HTTP proxy server is a relay device. In another example, users on a small network (e.g. a home network) may use a SOCKS proxy (see RFC 1928) to connect to the Internet from multiple personal computers using one Internet connection with a single IP address (see RFC 791). In this example, the SOCKS proxy is a relay device. In another example, some HTTP proxies serve as cache proxies, by storing local copies of the content they receive and then serving requests for the same content from local storage. By doing that, cache proxies reduce the number of requests sent to remote servers. In another example, HTTP proxies serve as content filtering proxies, by denying users' access to objectionable materials.

Besides these normal uses, relay devices are often exploited for malicious purposes.

For example, a malicious user (attacker) will use a relay device to hide his real IP address. IP addresses are often used to expose the identity of an attacker by examining Internet Service Provider (ISP) records to reveal who used the IP address at the time of the attack. Since the attacked party sees the communications as originating from the relay device's IP address, the attacker remains anonymous and is less likely to suffer consequences (e.g. losing his ISP account or getting arrested). This technique is often used by hackers, fraudsters and scammers.

An attacker may also use several relay devices at once by instructing one relay device to connect to another relay device and so on, and instructing the last relay device to connect to the target. This protects the attacker in case the operator of the last relay device is asked to provide the IP address used in the attack.

In another example, an attacker will use a large number of relay devices to create the illusion that communications are originating from many different users. Attackers use this technique to circumvent anti-abuse systems that block IP addresses based on the rate of potentially abusive actions they make (i.e. number of actions made in a time period). For example, many online services that use passwords to authenticate their users will block an IP address after a few failed login attempts, in order to prevent brute force attacks. In a brute force attack, an attacker attempts to recover a password by trying many different passwords until a successful login. In another example, many online services which provide access to a directory of personal information will block an IP address if the rate of queries it sends exceeds a certain limit, in order to prevent attackers from harvesting large amounts of personal information, which can be used for other abusive actions such as sending spam (unsolicited electronic messages). In another example, anti-spam systems will block IP addresses that send a high volume of messages. In another example, since web sites can get paid for each time a user views an online advertisement (or click on it), online advertising companies will ignore large numbers of advertisement views (or clicks on advertisements) that originate from the same IP address, to prevent scammers from generating false views of (or clicks on) advertisements.

By using multiple relay devices, scammers circumvent these defenses.

In another example, an attacker will use a relay device to create the illusion that he is located in a different geographical location. Since many online credit card fraud attempts originate from outside the United States, many US online merchants will not accept foreign credit cards or ship products abroad. Fraudsters can overcome these barriers by using US credit cards and shipping to accomplices in the US. Merchants responded by rejecting orders in which the geographic location of the IP address (as reported by IP geo-location services such as GeoPoint offered by Quova, Inc. of Mountain View, Calif., USA; See U.S. Pat. Nos. 6,684,250 and 6,757,740), does not match the address or addresses provided in the order (e.g. the credit card billing address is in the US, while the IP address is in Indonesia). Fraudsters overcome this barrier by using relay devices in acceptable locations.

While properly configured relay devices usually implement access control mechanisms to allow access only to authorized users, many relay devices are globally accessible (known as 'open proxies') and are abused by attackers. In some cases, open proxies exist because they are shipped as part of a hardware device or software and were unknowingly installed by their owners, or because administrators have mistakenly or carelessly configured relay devices to relay communications from unauthorized sources. In other cases the open proxy is maliciously installed without the permission of the computer owner, such as by sending a 'Trojan Horse' to the computer's owner, by a computer virus, or by manually hacking into the computer (hacking is the act of exploiting a malfunction or misconfiguration to gain control over the computer).

Since relay devices, and especially globally accessible relay devices are often used for malicious purposes, many online service providers and merchants treat any communication received through a relay device as malicious. For example, many SMTP servers (see RFC 821) will not accept emails received through relay devices, many IRC servers (see RFC 2810) will not accept users connected through relay devices, and some Internet merchants will not accept orders received through relay devices.

Current methods for determining whether a communication is being relayed through a relay device are based on examining whether communications from the source IP address of the communication are typical to a relay device (assuming the relay device reports its own source IP address in the relayed communication).

One such method is examining whether an HTTP communication contains HTTP headers unique to relay devices. Examples of such headers include 'X-Forwarded-For', 'X-Originating-IP', 'Via', 'X-Cache' and 'Client-IP'. This method is limited in that it cannot be used when the relayed protocol is not HTTP. It is further limited in that not all relay devices report such headers, especially if relaying is performed at a level below HTTP, as is the case with SOCKS proxies or when using the HTTP CONNECT method (see RFC 2817).

Another method is to attempt to connect back to the source IP address (create a 'backward connection') using an agreed upon protocol, which is not likely to be implemented by relay devices. For example, many IRC servers will attempt to connect back to the source IP address using the Identification Protocol (see RFC 1413), which most IRC clients implement. Since relay devices are not likely to implement the Identification Protocol, receiving an indication from the source IP address that the connection attempt was successful (e.g. a TCP segment containing the SYN and ACK control flags; for an explanation of TCP see RFC 793) would indicate that the communication is most likely not being relayed. This method is limited in that service providers and users must agree on a protocol that would be used for backward connections, in that service providers must originate a connection to every user using the agreed upon protocol, and in that every user must operate a server to accept such connections.

Another method involves creating a backward connection to the source IP address using protocols and port numbers commonly used for relay devices (e.g. SOCKS on TCP port 1080 or HTTP on TCP port 8080) and then attempting to relay a communication. Since most users do not operate globally accessible communication relays on their computers, a successful attempt would indicate that the user is most likely using a relay device. This method is limited in that service providers must originate backward connections to every user, and in that a multitude of backward connections are required to cover a significant portion of the relay devices configurations possible. This method is further limited in that creating multiple backward connections is a resource consuming operation, and may be regarded unethical, abusive or otherwise problematic.

In an effort to alleviate the limitations of the current methods, online service providers cooperate with each other by sharing information about relay devices. For example, service providers often query databases (known as 'blacklists') that list various communication parameters of globally accessible communication relays, as discovered by other service providers or by the database operators, for example to check if a given source IP address is listed. Such a database is the MAPS Open Proxy Stopper maintained by Mail Abuse Prevention System LLC of San Jose, Calif., USA. These databases are as limited as the methods used to populate them, and are further limited by not being always up to date.

There is an apparent need for an effective method to determine whether a communication is being relayed through a relay device.

BRIEF SUMMARY OF THE INVENTION

It is now disclosed for the first time a method for determining whether information elements received from a potential relay device have been relayed through a relay device. The disclosed method of determining whether a potential relay device is a relay device includes receiving first and second information elements from the potential relay device, wherein the potential relay device is an original source of the second information element.

In some embodiments, the disclosed method further includes determining whether a feature of an original source of the first information element and a feature of the potential relay device are features unlikely to relate to a single device. In some embodiments, the disclosed method further includes determining whether a feature of an original source of the first information element and a feature of the potential relay device are features unlikely to describe a single device.

Several features of transmitters and original sources of information elements that are surprisingly useful for determining if a received information element has been relayed are disclosed herein. Features of transmitters and original sources of information elements useful for detecting if a received information element has been relayed include but are not limited to a configuration status of a device, communications performance of a device, a feature of a related DNS request, and a latency parameter such as a round trip time to a transmitter and/or original source of information elements.

According to some embodiments, the second information element is of a type that a relay device of a class of relay devices is unlikely to relay.

According to some embodiments, the first information element is of a type that a relay device of a class of relay devices is likely to relay.

Exemplary classes of relay devices relevant for embodiments of the present invention include, but are not limited to, SOCKS proxies, HTTP proxies including HTTP proxies using a GET method and/or a CONNECT method, IP routers and Network Address Translation devices.

According to some embodiments, the first information element and/or second information element are part of a communication of a type selected from the group consisting of IP, TCP, ICMP, DNS, HTTP, SMTP, TLS, and SSL. According to some embodiments, the first and second information elements are parts of a single communication.

According to some embodiments, the first and second information elements are sent in two different layers of a protocol stack.

According to some embodiments, the stage of determining includes discovering the feature of an original source of the first information element, and discovering the feature of the potential relay device.

According to some embodiments, the stage of determining further includes comparing the feature of the original source of the first information element with the feature of the potential relay device.

Thus, in one illustrative example, a configuration status parameter such as an operating system is determined both for an original source of the first information element, and for the potential relay device. If a discrepancy is discovered between configuration status parameters of the original source of the information packet and the potential relay device, this is unlikely to indicate a single device, and it is thus deduced that the potential relay device is not the same device as the original source device, but rather a separate relay device.

In some embodiments, the method comprises obtaining a parameter indicative of the feature of an original source of the first information element, and obtaining a parameter indicative of the feature of the potential relay device.

Thus, it is noted that it is not necessary to explicitly obtain knowledge of the features of the source of the first information element and the source of the potential relay device. In a specific example, a differential latency between the potential relay device and the source of the first information element is obtained, without necessarily obtaining the individual latencies.

In some embodiments, the method includes obtaining a parameter indicative of a relationship between the feature of the original source of the first information element and the feature of the potential relay device.

In some embodiments, the stage of determining includes analyzing the parameter indicative of a relationship between the feature of the original source of the first information element and the feature of the potential relay device In some embodiments, the parameter is obtained from at least one of the first information element and the second information element.

According to some embodiments, the method further comprises sending an outgoing communication to at least one of the original source of the first information element and the potential relay device, and receiving a third information element from at least one of the original source of the first information element and the potential relay device.

According to some embodiments, the method further includes deriving from the third information element information related to a feature of at least one of the original source of the first information element and the potential relay device.

According to some embodiments, the method further includes verifying that an original source of the third information element is the original source of the first information element According to some embodiments, the method further includes verifying that an original source of the third information element is the potential relay device.

In one exemplary embodiment, after receiving first and second information elements that may have been relayed, an HTTP response and a ping are returned to the purported source of the communication. Irrespective of the presence of an intermediate relay device, the HTTP response is relayed by the relay device to the original source of the communications, which in turn, returns a third information element. In contrast, the relay device responds to the ping without forwarding the ping to the original source of the first information element. Thus, wide differential in latencies is indicative of the presence of a relay device.

According to some embodiments, the method further includes receiving a third information element from the potential relay device, and deriving from the third information element information related to a feature of the potential relay device.

According to some embodiments, the method further includes receiving a third information element from the source of the first information element and deriving from the third information element information related to a feature of a source of the first information element.

According to some embodiments, at least one of the feature of a source of the first communication and the feature of the potential relay device is a feature related to a configuration status.

Exemplary features related to a configuration status include but are not limited to an operating system type, an operating system version, a software type, an HTTP client type, an HTTP server type, an SMTP client type, an SMTP server type, a time setting, a clock setting and a time zone setting.

According to some embodiments, the stage of determining includes examining a parameter indicative of the feature related to a configuration status.

Exemplary parameters indicative of the feature related to a configuration status include but are not limited to HTTP 'User-Agent' header, An RFC 822 'X-Mailer' header, An RFC 822 'Received' header, An RFC 822 'Date' Header, a Protocol implementation manner, a TCP/IP Stack Fingerprint, an IP address, a TCP port, a TCP Initial Sequence number, a TCP Initial Window, a Whois record, a Reverse DNS record, and a rate of acknowledged information.

According to some embodiments, at least one of the feature of a source of the first communication and the feature of the potential relay device is a feature related to communication performance.

According to some embodiments, the feature related to communication performance is selected from the group consisting of a measured communication performance, a measured relative communication performance, and an estimated communication performance.

According to some embodiments, the feature related to communication performance is selected from the group consisting of a latency of a communication, a latency of an incoming communication, a latency of an outgoing communication, a communication rate, an incoming communication rate, an outgoing communication rate, incoming maximum communication rate, and an outgoing maximum communication rate.

According to some embodiments, the stage of determining includes examining a parameter indicative of the feature related to communication performance.

According to some embodiments, the parameter is selected from the group consisting of time of receipt of an information element, time of sending of an information element, a round trip time, a roundtrip time gap, an IP address, a Whois record, a Reverse DNS record, and a rate of acknowledged information.

According to some embodiments, a higher round trip time gap is indicative of a higher likelihood that a relay device is being used for malicious purposes.

According to some embodiments, at least one of the feature of a source of the first information element and the feature of the potential relay device is selected from the group consisting of a sub-network, a network administrator, and a geographic location.

According to some embodiments, the determining includes examining a parameter indicative of at least one of the feature of a source of the first communication and the feature of a source of the second communication, and the parameter is selected from the group consisting of an HTTP "User-Agent" header, an RFC 822 'X-Mailer' header, an RFC 822 'Received' header, an RFC 822 'Date' Header, an IP address, a WHOIS record, and a reverse DNS record.

It is now disclosed for the first time a method of determining whether a potential relay device is a relay device. The disclosed method comprises receiving first and second information elements from the potential relay device, wherein the potential relay device is an original source of the second information element, and analyzing a configuration status of an original source of at least one of the first and the second information elements, wherein the configuration status is selected from the group consisting of an operating system type, an operating system version, a software type, an HTTP client type, an HTTP server type, an SMTP client type, an SMTP server type, a time setting, a clock setting, and a time zone setting.

It is now disclosed for the first time a method of determining whether a potential relay device is a relay device. The disclosed method comprises receiving first and second information elements from the potential relay device, wherein the potential relay device is an original source of the second information element, and analyzing a feature related to communication performance of an original source of at least one of the first and the second information elements.

According to some embodiments, the feature related to communication performance is selected from the group consisting of a latency of a communication, a latency of an incoming communication, a latency of an outgoing communication, a round trip time of a communication, a communication rate, an incoming communication rate, an outgoing communication rate, incoming maximum communication rate, and an outgoing maximum communication rate.

It is now disclosed for the first time a method of determining whether a potential relay device is a relay device. The disclosed method comprises sending a message to the potential relay device inducing a final recipient of the message to send an outgoing DNS request, and determining from the outgoing DNS request whether the potential relay device is a relay device.

It is now disclosed for the first time a method of determining whether a potential relay device is a relay device. The disclosed method comprises receiving first and second information elements from the potential relay device, wherein the potential relay device is an original source of the second information element; and checking whether a round trip time to the potential relay device is significantly different than a round-trip time to an original source of the first information element.

It is now disclosed for the first time a method of determining whether a potential relay device is a relay device. The disclosed method comprises receiving first and second information elements from the potential relay device, wherein the potential relay device is an original source of the second information element; and checking whether an operating system of the potential relay device is different than an operating system of an original source of the first information element.

It is now disclosed for the first time a method of determining whether a potential relay device is a relay device. The disclosed method comprises receiving first and second information elements from the potential relay device, wherein the potential relay device is an original source of the second information element, and checking whether a location of the potential relay device is different than a location of an original source of the first information element.

It is now disclosed for the first time a method of determining whether a potential relay device is a relay device. The disclosed method comprises receiving first and second information elements from the potential relay device, wherein the potential relay device is an original source of the second information element; and checking whether an administrator of the potential relay device is different than an administrator of an original source of the first information element.

It is now disclosed for the first time a method of determining whether a potential relay device is a relay device. The disclosed method comprises determining whether a feature of an original source of a first information element and a feature of the potential relay device are features unlikely to relate to a single device, wherein the potential relay device is a transmitter of the first information element and of a second information element, wherein the potential relay device is an original source of the second information element, and wherein a positive result of the determining is indicative that the potential relay device is a relay device.

It is now disclosed for the first time a method of determining whether received information was relayed by a relay device. The disclosed method comprises determining from the received information element a communications performance measurement, and generating from results of the determining output indicative of whether the received information was relayed by the relay device.

It is now disclosed for the first time a method of determining whether received information was relayed by a relay device. The disclosed method comprises determining from the received information element a parameter indicative of communications performance, and generating from results of the determining output indicative of whether the received information was relayed by the relay device.

Exemplary determined communication performance measurements include but are not limited to a latency of communication with a monitored host, an incoming latency of communication with a monitored host, an outgoing latency of communication with a monitored host, a communication rate, an incoming communication rate, an outgoing communication rate, incoming maximum communication rate, and an outgoing maximum communication rate.

It is now disclosed for the first time a system for determining whether a potential relay device is a relay device. According to some embodiments, the disclosed system includes an information element receiver, for receiving information elements from a plurality of devices including an information source device and the potential relay device, and a feature incompatibility analyzer, for determining whether a feature of the information source device and a feature of the potential relay device are features unlikely to relate to a single device.

According to some embodiments, the system further includes a feature discovery module, for discovering at least one feature selected from the group consisting of a feature of the information source device and a feature of the potential relay device.

Optionally, the information element receiver is further configured to receive information elements from a monitored host.

Optionally, the system includes an outgoing information element sender.

According to some embodiments, the system further includes a parameter obtainer, for obtaining at least one parameter selected from the group consisting of a parameter indicative of a feature of an information source device, a parameter indicative of a feature of the potential relay device, and a parameter indicative of whether a feature of the information source device and a feature of the potential relay device are features unlikely to relate to a single device.

According to some embodiments, the system further includes a feature database for storing a map between pairs of features and data indicative of whether the pairs of features are incompatible features.

These and further embodiments will be apparent from the detailed description and examples that follow.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIG. 2A provides a diagram of a Potential Relay Device sending Information Elements to Relay Detection System.

FIG. 2B provides a diagram of the original sources of information elements received by a Relay Detection System according to some embodiments of the present invention.

FIG. 5A provides a diagram of the case in which Information Source Device sends two information elements, Potentially Relayed Information Element 1 and Potentially Relayed Information Element 2, directly to Monitored Host, without using Relay Device.

FIG. 5B provides a diagram of the case in which two different devices, Information Source Device and Information Source Device 2 each send an information element to a Monitored Host, wherein both information elements are relayed by a Relay Device.

DETAILED DESCRIPTION OF THE INVENTION

Prior to setting forth the invention, it may be helpful to an understanding thereof to first set forth definitions of certain terms that are used hereinafter.

As used herein the term "communication" refers to the transfer of at least one information element between two devices. For example, an IP packet transferred over the Internet from one device to another device is a communication. In another example, an HTTP request transferred from an HTTP client to an HTTP server over the Internet is a communication. It should be noted that one or more communications could be transferred in one or more other communications. A group of communications in which one communication contains the other is called a 'Protocol Stack'. For example, a communication in the HTTP protocol (i.e. an HTTP request or response) is normally contained in a communication in the TCP protocol (i.e. a TCP connection), which is in turn contained in a communication in the IP protocol (i.e. one or more IP datagrams).

As used herein the term "original source of an information element" refers to the device that sent that information element, but has not relayed that information element from another device.

As used herein the term "transmitter" refers to a device that sent an information element, including in cases where the information element was previously relayed from another device. When an information element is received from a device, that device is a transmitter of that information element.

As used herein the term "feature" refers to any information about a device that may be different between two different devices.

Embodiments of the present invention recite the receiving and/or the sending of "information elements" over a data network. In some embodiments, information elements are communicated using a communication protocol. Exemplary communication protocols for communicated information elements over a data network include but are not limited to HTTP, SMTP, DNS (see RFC 1034), SSL/TLS (see RFC 2246), TCP, UDP (see RFC 768), IP, and ICMP (see RFC 792).

Figure 1:
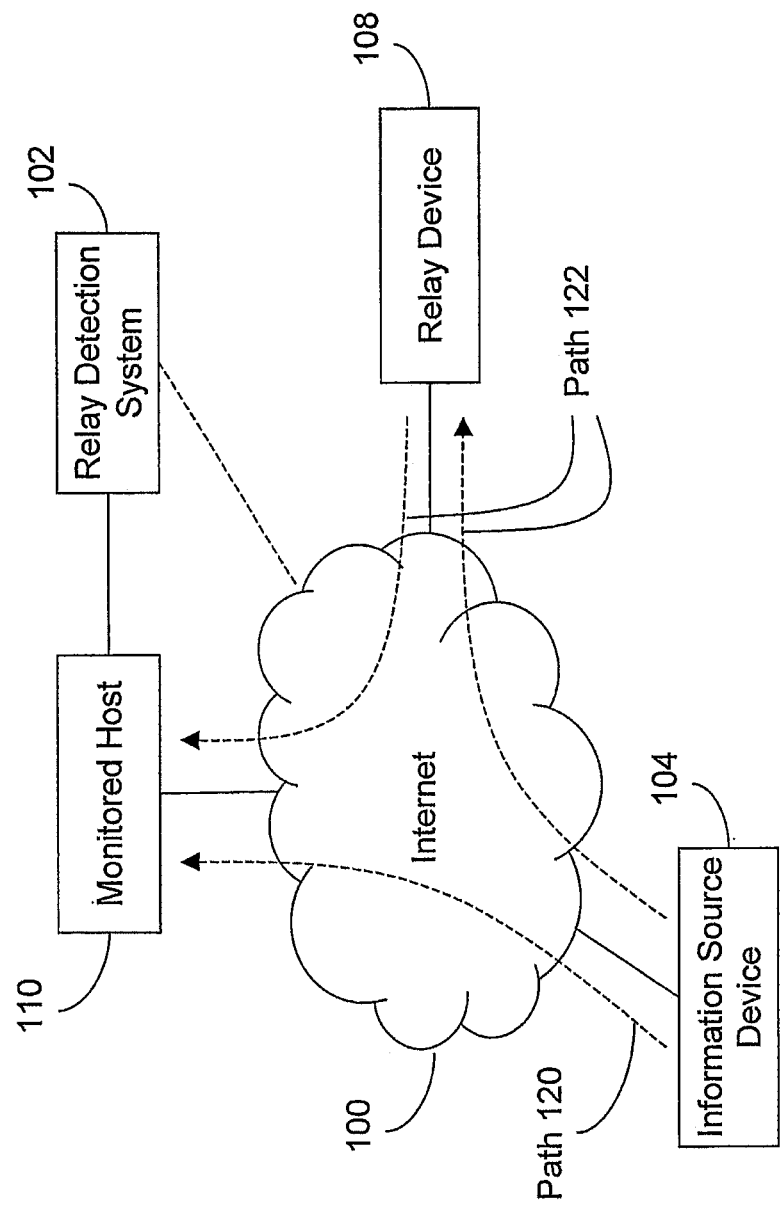
FIG. 1 provides an illustration of an environment in which a Relay Detection System operates according to some embodiments of the present invention.

FIG. 1 provides an illustration of an environment in which a Relay Detection System 102 operates according to some embodiments of the present invention. In some embodiments, Relay Detection System 102 (RDS) receives information elements communicated from an Information Source Device 104 (ISD) over the Internet 100.

In some instances, in order to send information elements to a Monitored Host 110 (MH), an ISD 104 first sends information elements to a Relay Device 108 (RD), which receives the information elements and subsequently relays the received information elements to the MH 110. For these instances, the relayed information elements travel from the Information Source Device 104 to the Monitored Host 110 as denoted by path 122.

Alternately, the ISD 104 does not use the Relay Device 108, and sends the information elements to the Monitored Host 110 without traversing the RD 108, as denoted by path 120.

It is desired to ascertain whether or not information elements sent to the MH 110 are sent through an RD 108.

The present inventors have devised methods, apparatus and computer readable software for determining whether information elements sent to MH 110 were sent via an RD 108. In some embodiments, the determining is performed by RDS 102, which monitors at least one communication received by the MH 110 and attempts to determine whether a communication is sent to the MH 110 using RD 108. As used herein the term 'monitor' refers to the act of receiving communications, including in cases where the communications were sent from or to the device that is performing the monitoring.

Any class of relay devices is appropriate for the present invention. Examples of classes of relay devices include but are not limited to SOCKS Proxies (see RFC 1928), HTTP Proxies used with the GET method (see RFC 2616), HTTP Proxies used with the CONNECT method (see RFC 2817), IP Routers (see RFC 1812), and NAT devices (see RFC 2663).

ISD 104 is a device configured to communicate with other devices over any data network, such as Internet 100. In some embodiments, ISD 104 is a device operated by a person or group of persons. In some embodiments, ISD 104 is a device operating automatically. In some embodiments, ISD 104 is a device operating automatically in a manner that simulates the actions of a person. Exemplary ISDs include but are not limited to a computer running an HTML browser such as Microsoft Internet Explorer (for an explanation of HTML see the HTML Specification in the W3C website at http://www.w3.org/TR/html), a computer running an IRC client, a computer running an SMTP client, and a cellular phone running an XHTML browser. MH 110 is a device configured to communicate with other devices over any data network, such as Internet 100. In one exemplary embodiment, Monitored Host 110 is a server. Examples of appropriate Monitored Hosts 110 include but are not limited to an HTTP server, a SSL/TLS server, an SMTP server, a file server, a telnet server, an FTP server, an SSH server, a DNS server, and an IRC server. Examples of uses of MH 110 include but are not limited to hosting an online merchant, running an online advertising service, and receiving email.

In some embodiments, RDS 102 monitors information elements sent from and/or to the MH 110. Optionally, RDS 102 is further configured to communicate with the RD 108 and/or the ISD 104. Optionally, the RDS 102 is further configured to monitor information elements sent from and/or to the RDS 102.

Each of the RDS 102, ISD 104, RD 108, and MH 110 may be hardware, software or a combination thereof, may reside at the same or at different geographical locations, or may be components of the same device.

For simplicity reasons, the presented environment contains one information source device, and one relay device. In practice, there are many information source devices connected to the Internet 100, and each of them may or may not use one of several relay devices that are also connected to the Internet 100. The goal of the present invention is to differentiate between the general case of an information source device that does not use a relay device, and the general case of an information source device that does use a relay device. It will be appreciated that the extrapolation from the presented environment to real-life environments such as the Internet or other networks is well within the scope of the skilled artisan.

Referring to FIG. 2A, it is noted that according to some embodiments of the present invention, the RDS 102 receives information elements sent to the MH 110, wherein a Potential Relay Device 150 (PRD) is a transmitter of the information elements, but is not necessarily the original source of each or any of the information elements. According to some embodiments, the identity of Potential Relay Device 150 (PRD) is unknown and may be either RD 108, or ISD 104.

Some embodiments of the present invention provide methods, apparatus and computer readable software for determining whether PRD 150 is RD 108 or ISD 104.

FIG. 2B provides a diagram of the original sources of information elements received by RDS 102 according to some embodiments of the present invention. A first information element and a second information element are received by RDS 102. According to some embodiments, PRD 150 is the original source of the second information element, and thus the second information element may also be referred to as a Non-Relayed Information Element (NRIE). In contrast, ISD 104 is the original source of the first information element, and thus the first information element may also be referred to as a Potentially Relayed Information Element (PRIE). Therefore, in the case where PRD 150 is ISD 104 then PRD 150 is the original source of the PRIE, and in the case where PRD 150 is RD 108 then PRD 150 is not the original source of PRIE.

In particular embodiments, the NRIE is of a type not relayed by a specific class of relay devices, thus ensuring that the second information element is not actually relayed by a relay device of that class. For example, a standard HTTP Proxy (either using the CONNECT or the GET methods) does not relay ICMP messages. Therefore, if RD 108 is a proxy of that type and RD 108 is a transmitter of an ICMP message, then the ICMP message can be assumed to be an NRIE.

According to some embodiments of the present invention, it is determined whether a feature of ISD 104 and a feature of PRD 150 are features that are unlikely to relate to the same device (Incompatible Features). A feature is said to relate to a device if the feature is information about that specific device.

In some embodiments, the feature of ISD 104 is derived from the content of the PRIE. In alternate embodiments, the feature of ISD 104 is derived from other characteristics described below. In some embodiments, the feature of PRD 150 is derived from the content of the NRIE. In alternate embodiments, the feature of PRD 150 is derived from other characteristics described below.

It is also noted that it is not a requirement of the present invention to actually obtain either a feature of PRD 150 or a feature of ISD 104. In some embodiments detailed below, the RDS 102 can determine whether or not the features are Incompatible Features, without discovering each or any of the features. The presence of Incompatible Features increases the likelihood that ISD 104 and PRD 150 are distinct devices (i.e. PRD 150 is RD 108), while the absence of Incompatible Features increases the likelihood that PRD 150 and ISD 104 are the same device (i.e. PRD 150 is not RD 108).

Figure 2C:
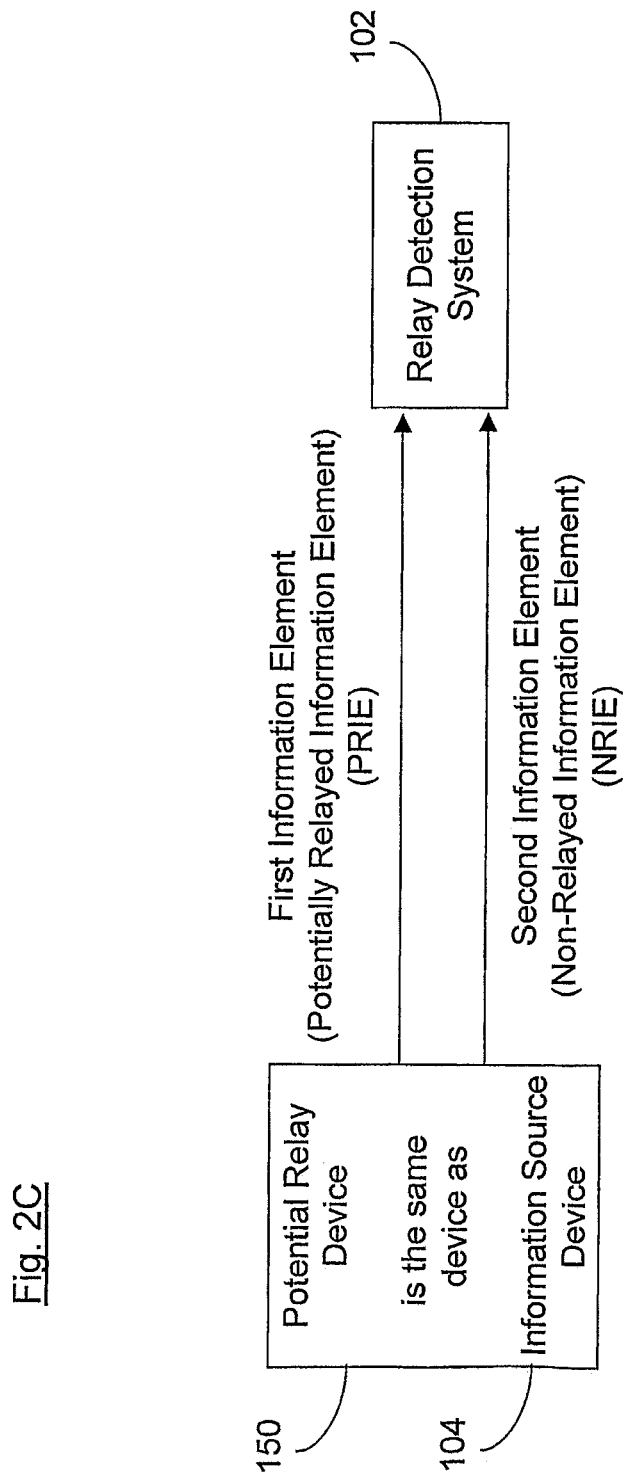
FIG. 2C provides a diagram of the case wherein Potential Relay Device is Information Source Device.

FIG. 2C provides a diagram of the case wherein PRD 150 is ISD 104. In this case, it is detected that the original source of the first information element (ISD 104) is the same device as the original source of the second information element (PRD 150), and it may therefore be concluded that the Potential Relay Device 150 is the ISD 104 and NOT a Relay Device 108, and it may also be concluded that PRIE was not relayed by the Relay Device 108.

Figure 2D:
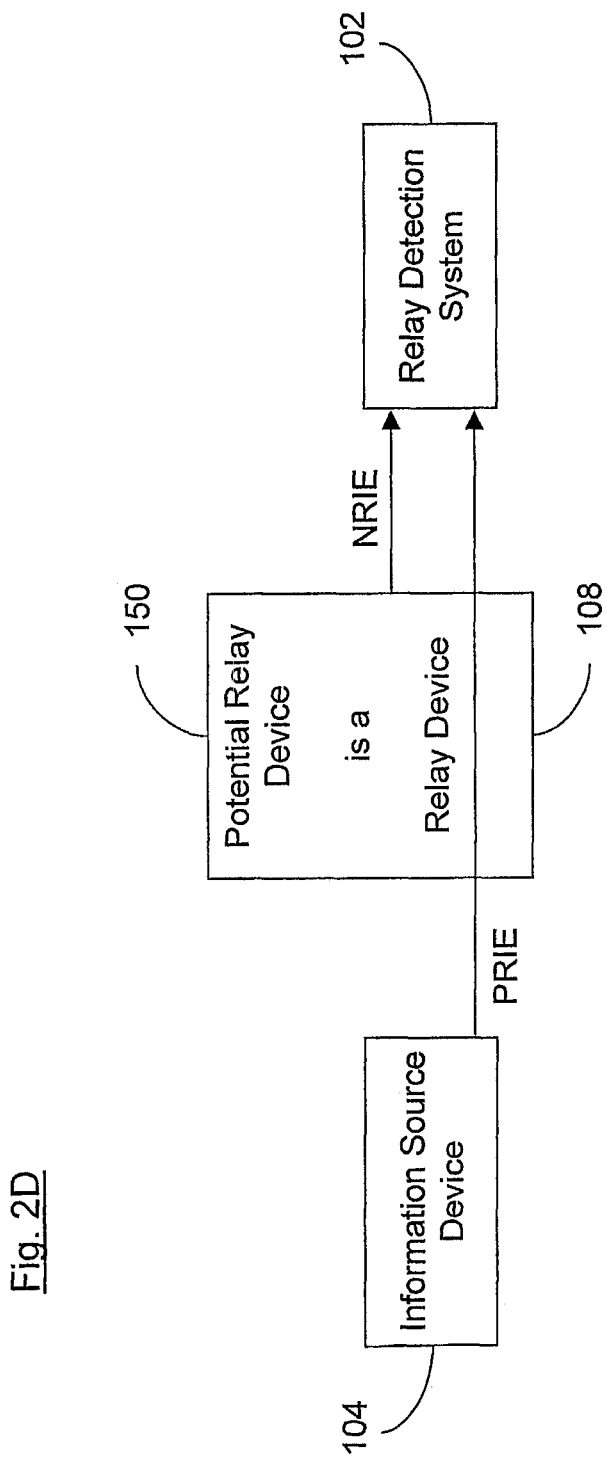
FIG. 2D provides a diagram of the case wherein Potential Relay Device and Information Source Device are distinct devices.

FIG. 2D provides a diagram of the alternate case wherein PRD 150 and ISD 104 are distinct devices. In this case, it is detected that the original source of the first information element (ISD 104) is a different device than the original source of the second information element (PRD 150). Thus, since PRIE has an original source that is not PRD 150, it is concluded that PRIE has been relayed by PRD 150, and that therefore PRD 150 is a Relay Device 108.

As used herein, the term "feature" refers to at least one feature. Thus, it is disclosed that a combination of more than one feature is defined as a feature in and of itself.

As used herein, an "ISD-Feature" is a feature of the original source of the first information element (i.e. the source of the PRIE, which is ISD 104), while a "PRD-Feature" is a feature of the source of the second information element (i.e. the source of the NRIE, which is PRD 150). Examples of ISD-Features, PRD-Features, methods of discovering these features, and the way in which these features can be used to determine whether ISD 104 is a different device than PRD 150 are given below.

As stated above, one option for ensuring that the NRIE was not relayed by RD 108 is to select the NRIE to be of an information element type known not to be relayed by relay device of the specific class of relay devices to which RD 108 belongs. For example, it is known that certain SOCKS proxies relay HTTP communications but do not relay TCP communications. If RD 108 is a SOCKS proxy it will maintain one TCP connection with ISD 104 and another separate TCP connection with MH 110, and will relay HTTP communications from one TCP connection to the other. Thus, in some embodiments, the PRIE is part of a possibly relayed HTTP communication, and the NRIE is part of a non-relayed TCP communication.

In some embodiments, the first and second information elements (NRIE and PRIE) are part of two different layers on a Protocol Stack of a single communication. Thus, in one particular case a single HTTP over TCP communication is sent, and the first non-relayed information element is part of the TCP layer of the communication, while the second possibly relayed information element is part of the HTTP layer of the communication. Alternately, the first and second elements are parts of two separate communications.

Sometimes, however, the class of the Relay Device 108 is not necessarily known to the Relay Detection System 102. In some embodiments, the disclosed method explicitly requires an optional step of estimating or targeting a specific class of relay devices, and performing the method under the assumption that a potential class of relay devices is of that targeted class of relay devices.

In some embodiments, methods of the present invention are repeated for different pairs of NRIE and PRIE, wherein each pair is instrumental in detecting at least one class of relay devices.

In general, it is disclosed that in some embodiments, a disclosed method may repeated sequentially or in parallel a number of times, wherein a final likelihood that a potential relay device is a relay device is derived from some sort of aggregate of results from the repeated methods. In some embodiments, obtaining an aggregate includes obtaining an average, a weighted average, a minimum, maximum or any other method of characterizing aggregate results known in the art.

Using Communication Latency

In one particular embodiment of the present invention, ISD-Feature is chosen to be the latency of communications between ISD 104 and MH 110, and PRD-Feature is the latency of communications between PRD 150 and MH 110. Since the latency from one device to another device is usually relatively stable, then the same device is not likely to exhibit two significantly different latencies. Therefore, if the ISD 104 latency and the PRD 150 latency are significantly different, then it is relatively more likely that PRD 150 and ISD 104 are distinct devices (i.e. PRD 150 is a Relay Device 108, and PRIE was being relayed). Similarly, if the ISD 104 latency and the PRD 150 latency are similar, then it is relatively more likely that PRD 150 and ISD 104 are the same device (i.e. PRIE was not being relayed).

As used herein the term 'latency' refers to the time delay between the sending of a communication and its receipt.

Latency occurs because of various reasons. One reason is the time required for electric signals or electromagnetic waves to travel the distance between two points on the path of the communication (e.g. electric signals in an electric cable, light in an optical fiber, or microwaves in a microwave-link). Another reason is the time required for information to be transferred over a communication line (e.g. it would take 25 milliseconds (ms) for 1500 Bytes to be fully transferred over a 480 kilobits-per-second (kbps) communication line). Another reason is the store-and-forward method used in many data networks, wherein portions of the communications (e.g. packets or cells) are forwarded from one intermediate network element to the next, only after they have been received in full. Another reason is the delaying of communications in buffers of switching elements in the network (e.g. when a communication line is in the process of transferring one communication, new communications are saved in a buffer until the line is freed up). Another reason is the processing time of certain communications, such as for making routing decisions, encryption, decryption, compression or decompression.

Since a communication is sent from one device and received at a different device, it is usually easier to measure RoundTrip Time (RTT) rather than latency. RTT is the time passed between the sending of an outgoing communication (OC) from MH 110 and the receipt of an incoming communication by MH 110 (IC), which was sent immediately upon receipt of OC. RTT is therefore the sum of the latency of the OC and the latency of the IC. For example, when using the ICMP echo mechanism (see RFC 792), RTT is the time passed between sending the Echo message and receiving the Echo Reply message.

Figure 4A:
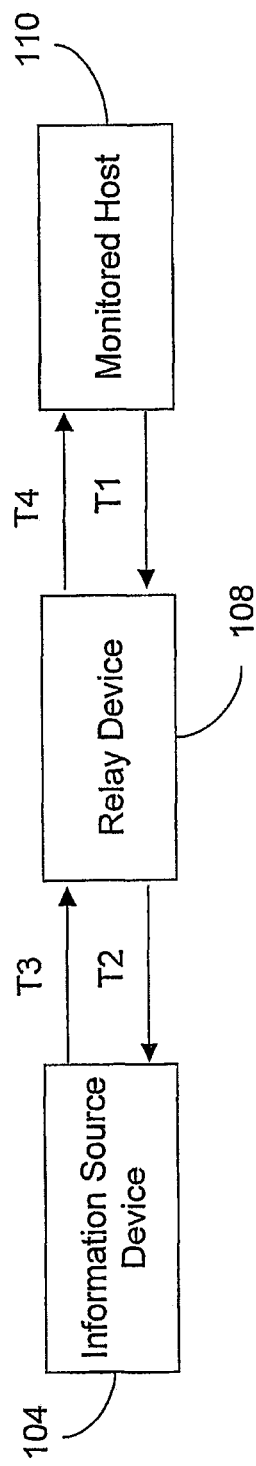
FIG. 4A describes the latencies of communications between Information Source Device and Monitored Host in the case where Relay Device is being used.

FIG. 4A describes the latencies of communications between ISD 104 and MH 110 in the case where RD 108 is being used.

T1 is the latency of communications from MH 110 to RD 108

T2 is the latency of communications from RD 108 to ISD 104.

T3 is the latency of communications from ISD 104 to RD 108.

T4 is the latency of communications from RD 108 to MH 110.

Figure 4B:
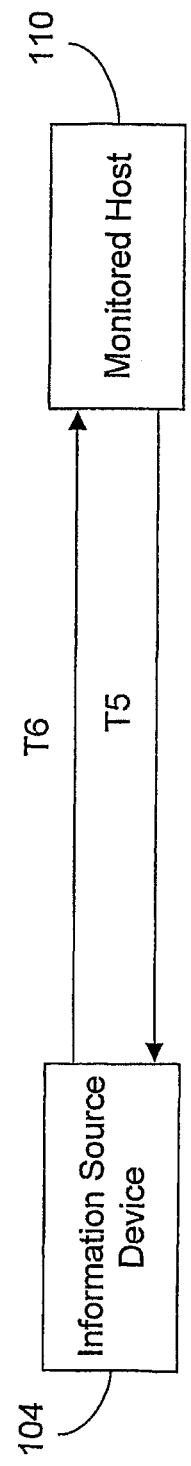
FIG. 4B describes the latencies of communications between Information Source Device and Monitored Host in the case where Relay Device is not being used.

FIG. 4B describes the latencies of communications between ISD 104 and MH 110 in the case where RD 108 is not being used.

T5 is the latency of communications from MH 110 to ISD 104.

T6 is the latency of communications from ISD 104 to MH 110.

As used herein the term "ISD RTT" refers to the round-trip time of communications between MH 110 and ISD 104.

As used herein the term "PRD RTT" refers to the round-trip time of communications between MH 110 and PRD 150.

As used herein the term "RTT gap" refers to the difference between ISD RTT and PRD RTT.

In the case where PRD 150 is RD 108 (i.e. PRIE is relayed) the round-trip time of ISD RTT should be longer than the PRD RTT. Specifically, PRD RTT is equal to T1+T4 (the RTT between MH 110 and RD 108), and ISD RTT is equal to T1+T2+T3+T4 (the RTT between MH 110 and RD 108 plus the RTT between RD 108 and ISD 104). The RTT gap equals to the RTT between PRD 150 (which is RD 108) and ISD 104, which is equal to T2+T3.

However, in the case where PRD 150 is ISD 104 (i.e. PRIE is not relayed) then ISD RTT and PRD RTT are both equal to T5+T6 (the RTT between MH 110 and ISD 104). The RTT gap should therefore be close to zero.

For example, if ISD RTT is 640 milliseconds and PRD RTT is 130 milliseconds, it is more likely that PRD 150 is Relay Device 108 and that PRIE is being relayed than if ISD RTT is 133 milliseconds and PRD RTT is 130 milliseconds.

It should be noted that even in the case where PRD 150 is ISD 104 some differences between ISD RTT and PRD RTT might be found, due to different network delays that each communication was subject to. However, in most practical cases the RTT gap when using a relay device is noticeably larger than the RTT gap When not using a relay device.

When measuring the RTT gap the RDS 102 is effectively performing two feature comparisons. The first is the comparison of the latency of a communication from ISD 104 to MH 110 compared to the latency of a communication from PRD 150 to MH 110. The second is the comparison of the latency of a communication from MH 110 to ISD 104 110 compared to the latency of a communication from MH 110 to PRD 150. Both latencies should be larger in relayed communications compared to non-relayed communications, meaning that the RTT gap, which is the sum of two latency differences, should also be larger in relayed communications compared to non-relayed communications.

In an exemplary embodiment RD 108 is a SOCKS proxy, ISD 104 is an HTTP client and MH 110 is an HTTP server. In this case, RDS 102 obtains the ISD RTT by measuring the RTT of an HTTP communication (a PRIE), and obtains the PRD RTT by measuring the RTT of a TCP communication (an NRIE).

In another exemplary embodiment RD 108 is an HTTP proxy using the CONNECT method, ISD 104 is an SMTP client, and MH 110 is an SMTP server. In this case, RDS 102 obtains the ISD RTT by measuring the RTT of an SMTP communication (a PRIE). RDS 102 then sends an ICMP Echo message to the source IP address of the TCP connection (an NRIE) in which the SMTP communication was received. RDS 102 then receives an ICMP Echo Reply message. The PRD RTT is the time between the two ICMP messages (as explained below the original source of the ICMP Echo Reply message is PRD 150).

Methods for measuring the RTT of various types of communications are described below.

The RTT gap is also useful in differentiating between various uses of relay devices. For performance and security reasons, legitimate users normally use a near-by relay device (e.g. on the same corporate network), resulting in a short RTT gap. On the other hand, malicious users often use a remote relay device (e.g. in another country), resulting in a long RTT gap. A long RTT gap is therefore indicative of a relay device used for malicious purposes. This method is especially effective in cases where malicious users cannot avoid using a remote relay device. For example, an Indonesian fraudster wishing to appear as if he is located in the USA must use a remote relay device. In another example, it would be significantly more difficult for a spammer to use a large number of relays if all of them must have short RTT gaps.

Measuring RTT

Accurate RTT measurements require that IC be sent immediately upon receipt of the OC. This may be achieved in several ways.

Some protocol implementations provide immediate response on some communications. For example, in a TCP three-way handshake a segment containing the SYN and ACK control flags (SYN-ACK segment) should be sent immediately upon receipt of the related segment containing the SYN control flag (SYN segment). The RTT in such a case is the time between sending of a SYN segment (OC) and receipt of a SYN-ACK segment (IC).

In other cases, the protocol implementation might not provide an immediate response, but an application handling the communications could be expected to generate it. For example, an HTTP client would normally generate an HTTP request immediately upon receiving an HTTP '302' response. In another example, an HTML browser would normally generate an HTTP request immediately upon receiving the first embedded image in an HTML page (e.g. using the HTML <img> tag). In another example, an SSL/TLS layer will send a ClientHello message immediately upon receiving the TCP SYN-ACK segment indicating the TCP connection was established. In another example, an SMTP client would normally send a 'RCPT' command immediately upon receiving a '250' response to a previous 'MAIL' command (see RFC 821). In another example, an IRC client would normally send a 'PONG' message immediately upon receiving a 'PING' message from an IRC server.

In other cases, human interaction could be used to generate immediate responses. For example, a user is presented with a game in which he should press a keyboard key immediately upon seeing a signal on the screen. The signal is presented when OC is received, and IC is sent when the user responds.

Several RTT measurements taken over a short period of time may produce different results. This is due to variations in network congestions and other parameters. It is therefore recommended to make several RTT measurements if possible. Furthermore, since the RTT cannot fall below the time it takes for the electric or electro-magnetic signal to travel the complete route, using the lowest of several RTT measurements will normally produce more accurate and reliable results.

It should be noted that a malevolent user may send an IC prior to receiving an OC. This will deceive RDS 102 to calculate a shorter RTT. It is therefore recommended to place some secret information in OC (secret information is information that cannot be easily obtained by a person or device that does not already know the secret), and require that IC contain the secret information (or a derivative of it). This prevents the sending of an IC before receiving the secret information in OC. For example, the HTTP '302' response described above may redirect the HTTP client to a URL that contains a secret. The HTTP client would then generate an HTTP request to that URL, thereby sending the same secret back. In another example, a TCP SYN-ACK segment (an OC) contains a secret Initial Sequence Number, and a TCP segment containing the ACK control flag (TCP ACK segment; an IC) contains an Acknowledgement Number, which is a derivative of the Initial Sequence Number. In another example, an ICMP Echo message (an OC) contains a secret Identifier, Sequence Number or Data, and an ICMP Echo Reply message (an IC) contains the same secret.

It should be noted that when calculating an RTT RDS 102 must also monitor communications sent by MH 110 (and not only communications received by MH 110), in order to detect the time at which each OC is sent. However, this requirement may be bypassed if an OC to ISD 104 and an OC to PRD 150 are known to be sent at the same time. In such a case, the RTTs are unknown, but the RTT gap may still be calculated, and is equal to the difference between the times of arrival of the respective IC's. For example, if PRIE is SSL/TLS and NRIE is TCP, the TCP SYN-ACK segment sent by MH 110 is such an OC, and the RTT gap is the time between receipt of the corresponding TCP ACK segment and receipt of the SSL/TLS ClientHello message.

If MH 110 does not send an OC, which can be used by RDS 102, RDS 102 may need to send such an OC by itself. For example, RDS 102 is monitoring HTTP communications to and from a website (MH 110). In order to measure the RTT of the PRIE, RDS 102 provides an HTTP '302' response for some of the HTTP requests received by MH 110, as described above. In this example RDS 102 may need to be a software module installed on MH 110, so it could respond to HTTP communications sent to MH 110.

In the embodiments involving measurements of latency or RTT it is recommended to check that ISD RTT is 'significantly different' than PRD RTT. The RTTs are significantly different when the difference between them is one that rarely occurs when making RTT measurements on communications with the same device. At the time of writing of this text, the RTT between two devices in a reasonably stable Internet environment does not vary by more than 50 milliseconds within a time frame of a few seconds. In contrast, the RTT gap in relayed communications usually exceeds 100 milliseconds. Therefore, in some embodiments, 'significantly different' can be interpreted to mean 'more than 60 milliseconds'. In some embodiments, 'significantly different' can be interpreted to mean 'more than 80 milliseconds'. In some embodiments, 'significantly different' can be interpreted to mean 'more than 100 milliseconds', and so forth.

In some embodiments, the RTT to a device is not directly measured but rather estimated based on other information known about the device, such as its geographical location, its IP address' reverse DNS record (i.e. host address to host name translation), and/or its IP address' WHOIS record (for information about the WHOIS service see the American Registry for Internet Numbers website at http://www.arin.net). For example, if MR 110 is located in New York City, N.Y., USA and an IP geo-location service indicates that PRD 150 is located in Los Angeles, Calif., USA and the text 'dsl' is found in the reverse DNS record of the PRD 150's IP address indicating it is likely a Digital Subscriber Line (DSL; for information about DSL see the DSL Forum website at http://www.dslforum.org), then RDS 102 can estimate that the RTT between MR 110 and PRD 150 is in the range of 65-85 milliseconds. This is because it is known that the RTT on the Internet between New York City and Los Angeles is usually approximately 55 milliseconds, and because it is known that a DSL usually adds an additional 10-30 milliseconds to the RTT.

Using Device Configuration Status

In another particular embodiment of the present invention, ISD-Feature and PRD-Feature are the configuration status of the ISD 104 and PRD 150, respectively. As used herein, the term 'configuration status' refers to the hardware and software of a device and the way they are customized.

If ISD-Feature and PRD-Feature are configuration statuses that are unlikely to relate to the same device, then it is relatively more likely that PRD 150 and ISD 104 are distinct devices (i.e. PRD 150 is a Relay Device 108, and PRIE was being relayed).

Similarly, if ISD-Feature and PRD-Feature are configuration statuses that are likely to relate to the same device, then it is relatively more likely that PRD 150 and ISD 104 are the same device (i.e. PRIE was not being relayed).

There are several known methods of detecting a device's configuration status from communications. One method is to use explicit configuration information provided by the device in the communication. For example, HTTP clients normally include in each HTTP request the header 'User-Agent' which provides information on the operating system type and version, the HTTP client type and version, and additional software installed on the device. Email applications may provide similar information in the RFC 822 'X-Mailer' header, email servers may provide such information in the RFC 822 'Received' header, and HTTP servers normally include in an HTTP response the header 'Server' which provides information on the HTTP server type and version.

Another method is to deduce the device's configuration status from the manner it implements various communication protocols. The popular network administration tool 'Nmap' includes many implementations of this method, as described in detail in the article 'Remote OS detection via TCP/IP Stack Fingerprinting' written by the developer of Nmap (available at http://www.insecure.org/nmap/nmap-fingerprinting-article.html). For example, the article suggests examining the Initial Window chosen by a TCP implementation, since different operating systems choose different numbers. It should be noted that while the article assumes that the investigated device is responding to a communication, this method is also applicable to communications initiated by a device (although the specific indications may vary).

In an example of this embodiment, where RD 108 is a SOCKS proxy, the RDS 102 monitors an HTTP request (PRIE) that includes the header 'User-Agent: Mozilla/4.0 (compatible; MSIE 6.0; Windows NT 5.0)'—This header indicates the operating system is Microsoft Windows 2000. The HTTP request is sent over a TCP connection (NRIE) that had an Initial Window of 5840—This is typical of other operating systems (specifically Red Hat Enterprise Linux). Since one device could not concurrently run two operating systems, then RDS 102 determines that ISD 104 and PRD 150 are distinct devices (i.e. PRD 150 is a Relay Device 108, and the HTTP request was being relayed). In this example, ISD-Feature is the information that ISD 104 is running a Microsoft Windows 2000 operating system, and PRD-Feature is the information that PRD 150 is running a Red Hat Enterprise Linux operating system.

In another example of this embodiment, where RD 108 is a HTTP proxy using the CONNECT method, the RDS 102 monitors an HTTP request (PRIE) that includes the header 'Mozilla/5.0 (Macintosh; U; PPC Mac OS X; en) AppleWebKit/124 (KHTML, like Gecko) Safari/125'—This header indicates the operating system is Apple Mac OS X. The HTTP request is sent over a TCP connection (NRIE). RDS 102 connects to port 80 of the source IP address of the TCP connection and sends an HTTP request. RDS 102 then receives an HTTP response containing the header 'Server: Microsoft-IIS/5.0' (as explained below the original source of this HTTP response is PRD 150). Since it is known that Microsoft IIS servers do not run on the Apple Mac OS X operating system, then RDS 102 determines that ISD 104 and PRD 150 are distinct devices (i.e. PRD 150 is a Relay Device 108 and the HTTP request from ISD 104 was being relayed). In this example, ISD-Feature is the information that ISD 104 is running an Apple Mac OS X operating system, and PRD-Feature is the information that PRD 150 is running a Microsoft IIS server.

In some cases it is necessary to send to the original source of an information element an OC that will cause the original source to send back an IC that could be used to determine its configuration. In the example given above where the HTTP 'Server' header is used, the HTTP request sent from RDS 102 to PRD 150 is an OC and the HTTP response is an IC. Methods of ensuring that an OC is sent to the original source of an information element, and methods of ensuring that an IC is received from the original source of an information element are disclosed below.

Using Location, Sub-network or Administrator Information

In another particular embodiment of the present invention, ISD-Feature and PRD-Feature are the location, sub-network and/or administrator of the ISD 104 and PRD 150, respectively. As used herein, the term 'location' refers to the geographic location of a device, the term 'sub-network' refers to the group of devices that is close to a device in the network topology, and the term 'administrator' refers to the organization that connects the device to the network (e.g. to the Internet). Examples of a device's location could be 'New York City, N.Y., United States of America' or 'Longitude 32 degrees 5 minutes North, Latitude 34 degrees 46 minutes East'. Examples of a device's sub-network could be 'all devices on the same local area network segment as the device whose IP address is 1.2.3.4'. Examples of a device's administrator could be 'Earthlink, Inc. of Atlanta, Ga., USA', which is an Internet Service Provider that connects users to the Internet for a fee, or 'General Electric Company of Princeton, N.J., USA', which is a company that connects some of its employees to the Internet as required for their work.

A single device is not likely to concurrently have two different locations, sub-networks or administrators. Therefore, if ISD 104 is found to be in a different location and/or on a different sub-network and/or has a different administrator than PRD 150, then it is relatively more likely that ISD 104 and PRD 150 are distinct devices (i.e. PRIE was being relayed). Similarly, if ISD 104 and PRD 150 are found to be in the same location and/or on the same sub-network and/or have the same administrator have, then it is relatively more likely that PRD 150 and ISD 104 are the same device (i.e. PRIE was not being relayed).

In an exemplary embodiment RD 108 is a SOCKS proxy, ISD 104 is an SMTP client and MH 110 is an SMTP server. In this case, RDS 102 uses the source IP address of the TCP session (an NRIE) and an IP geo-location service to estimate the location of the PRD 150. It then uses an RFC 822 'Date' header reported in the SMTP communication (a PRIE) to estimate the location of ISD 104. The 'Date' header indicates the time ('wall clock') and time zone configuration of the ISD 104, and is therefore an indication of its location (since devices are normally configured to the local time and time zone). If the two locations do not match (e.g. the geo-location service indicates that PRD 150 is located in New York City, while the ISD 104's time zone is GMT+7), then RDS 102 determines that PRD 150 and ISD 150 are distinct devices (i.e. PRD 150 is a Relay Device 108 and the SMTP communication was being relayed).

Alternative methods of estimating the location of PRD 150 (other than using an IP geo-location service) include but are not limited to: (a) Checking the IP address's WHOIS record. The address given in the WHOIS record is likely relatively close to the location of PRD 150; and (b) Checking the IP address's reverse DNS record (e.g. if the record ends with '.fr' then PRD 150 is likely in France).

Alternative methods of estimating the location of ISD 104 (other than using the 'Date' header in an SMTP communication) include but are not limited to: (a) (in case PRIE is SMTP) checking the last RFC 822 'Received' header reported in the SMTP communication, which should contain the time zone configuration of the SMTP server used by ISD 104, which is often the same as the time zone of the ISD 104 itself; (b) (in case PRIE is HTTP) checking the HTTP header 'Accept-Language', which indicate the languages supported by ISD 104 (e.g. the header "Accept-Language: ru" means ISD 104 supports content in the Russian language, and it is therefore relatively more likely that ISD 104 is located in Russia); and (c) checking the location of the source of another communication which was triggered by an event at the ISD 104 (an ISD Triggered Communication), as described in detail below, using any of the methods described above for estimating the location of PRD 150.

In another exemplary embodiment RD 108 belongs to a class of relay devices that do not relay TCP (i.e. TCP is a NRIE) and RDS 102 uses the source IP address of a TCP session to estimate the sub-network of PRD 150. This may be done by retrieving the WHOIS record, reverse DNS record or routing database record associated with that IP address (for information about routing databases see the RADb website at http://www.radb.net). This may also be done by discovering routers adjacent to PRD 150 using 'Time Exceeded' ICMP messages sent in response to IP packets with small Time-to-Live values, as done by the Unix utility traceroute (or the equivalent Microsoft Windows utility tracert), since devices in the same sub-network normally connect to the Internet 100 through the same routers. RDS 102 then estimates the sub-network of the ISD 104. This may be done by checking the sub-network of the source of an ISD Triggered Communication, as described in detail below, using any of the methods described above for estimating the sub-network of PRD 150. If the two sub-networks do not match (e.g. the sub-network names in the devices' WHOIS records are different or the devices do not have a common adjacent router), then RDS 102 determines that PRD 150 and ISD 150 are distinct devices (i.e. PRD 150 is a Relay Device 108 and the PRIE was being relayed).

In another exemplary embodiment wherein RD 108 belongs to a class of relay devices that do not relay TCP (i.e. TCP is a NRIE) and RDS 102 uses the source IP address of a TCP session to estimate the administrator of PRD 150. Exemplary methods for estimating the administrator include but are not limited to: (a) Retrieving the WHOIS record associated with that IP address (the organization name given in the record is likely the administrator); (b) Retrieving the reverse DNS record associated with that IP address (e.g. if the record ends with 'cox.net' then the administrator is likely 'Cox Communications of Atlanta, Ga., USA); (c) Retrieving the WHOIS record associated with the second-level domain in the reverse DNS record associated with that IP address; and (d) Retrieving the routing database record associated with that IP address. RDS 102 then estimates the administrator of ISD 104. Methods for estimating the administrator of ISD 104 include but are not limited to: (a) (in case PRIE is HTTP) checking the HTTP header 'User-Agent' which sometimes contains information about the administrator. For example, a 'User-Agent' header containing the text 'AOL 9.0' indicates the HTML browser installed on ISD 104 was provided by America Online, Inc. of Dulles, Va., USA (AOL). Since many Internet users receive their HTML browser from the same organization through which they connect to the Internet, this increases the likelihood that ISD 104 connects to the Internet through AOL (i.e. AOL is the administrator). In another example, the text 'Cox High Speed Internet Customer' indicates the browser was provided by Cox Communications, Inc. of Atlanta, Ga., USA; (b) (in case PRIE is SMTP) checking the RFC 822 'Organization' header, which sometimes contains information about the administrator; and (c) checking the administrator of the source IP address of an ISD Triggered Communication, as described in detail below, using any of the methods described above for estimating the administrator of PRD 150.

ISD Triggered Communications

Information about ISD 104 may be discovered by triggering ISD 104 to send communications. Such a communication is an 'ISD Triggered Communication'.

Exemplary ISD Triggered Communications that expose the IP address of ISD 104 are disclosed in PCT Application WO02/08853, the entirety of which is herein incorporated by reference. After receiving the ISD 104's IP address, RDS 102 may use the methods described above to find its location, sub-network or administrator. It can then compare them to the location, sub-network or administrator of the PRD 150, and determine whether they are different devices. Alternatively, RDS 102 can compare the ISD 104's IP address to the PRD 150's IP address directly. If they are different, it is relatively more likely that ISD 104 is a different device than PRD 150 (i.e. PRD 150 is a Relay Device 108, and PRIE was being relayed).

Another exemplary triggered communication is a DNS request. In some cases, ISD 104 will send a DNS request associated with a PRIE in order to translate a hostname into an IP address. The ISD 104 will send the DNS request to the DNS server(s) that it is configured to use. The ISD 104's DNS server will then send a DNS request to the authoritative DNS server for the given hostname. RDS 102 monitors DNS requests sent to this authoritative DNS server. It should be noted that although the DNS request that RDS 102 monitors may be received from DNS server that ISD 104 is configured to use, ISD 104 is the original source of at least one information element contained in the DNS request. US Patent application US2002016831, the entirety of which is herein incorporated by reference describes methods of causing a device to generate DNS requests, as well as methods of associating the DNS requests with the identity of the device that originated them. One method to associate a DNS request with the relevant PRIE is to configure the authoritative DNS server to reply with a different IP address to each request for translation of a hostname, and to keep a record of which DNS request received which IP address as a reply. When the PRIE is received at one of the IP addresses, the associated DNS request can be retrieved from the record.

After receiving the DNS Request from the ISD 104's DNS server, RDS 102 may use the methods described above to find its location, sub-network or administrator. For performance and economical reasons, many devices connected to the Internet are configured to use a DNS server that is in a similar location, on the same sub-network, or administered by the same administrator. RDS 102 can therefore compare the location, sub-network or administrator of the PRD 150, to the location, sub-network or administrator of the ISD 104's DNS server, respectively. If they do not match, it is relatively more likely that PRD 150 is a different device than ISD 104 (i.e. PRIE is being relayed).

Using Maximum Communication Rate

In another particular embodiment of the present invention, the maximum communication rate (MCR) of the PRD 150 and ISD 104 are used to determine whether they are the same device. The term MCR refers to the maximum amount of information a device can receive (incoming MCR) or send (outgoing MCR) during a time interval. 'Bits per Second' (bps) is a common measure of MCR. For example, some DSL lines have an incoming MCR of 1.5 Million bps (Mbps), and an outgoing MCR of 96 thousand bps (kbps).

If the MCR of the PRD 150 is different than that of the ISD 104 then it is more likely that ISD 104 is a different device than PRD 150 (i.e. PRIE is being relayed).

In an example of this embodiment, RD 108 is connected to the Internet 100 on a DSL line with a 1.5 Mbps incoming MCR and a 96 kbps outgoing MCR. Since relayed communication from MH 110 to ISD 104 are transferred through the incoming interface of RD 108 and then through its outgoing interface, then the incoming MCR of the ISD 104 could not exceed the outgoing MCR of RD 108 (96 kbps). Therefore, PRD 150's incoming MCR is 1.5 Mbps while ISD 104's incoming MCR is 96 kbps or less.

In another example of this embodiment, RD 108 is connected to the Internet 100 at an MCR of 20 Mbps in both directions, and ISD 104 is connected to the Internet 100 on a DSL line with a 1.5 Mbps incoming MCR and a 96 kbps outgoing MCR. Therefore, PRD 150's incoming MCR is 20 Mbps while ISD 104's incoming MCR is 1.5 Mbps, and PRD 150's outgoing MCR is 20 Mbps while ISD 104's outgoing MCR is 96 kbps.

Detecting MCR

According to some embodiments of the present invention, checking whether the MCR of ISD 104 is different than the MCR of PRD 150 is done by detecting the MCR of each and comparing them. One method of detecting an MCR is sending information to, or receiving information from, a device, using a protocol that automatically adjusts to the maximum communication rate possible, such as TCP, and observing the communication rate. For an explanation of some of the mechanisms used in TCP for adjusting to the MCR, see the article 'JACOBSON, V. Congestion avoidance and control. In Proceedings of SIGCOMM '88 (Stanford, Calif., August 1988), ACM' and the articles it references.

Another method of observing the incoming communication rate of a device involves monitoring receipt acknowledgements received from the device. For example, a device receiving information on a TCP connection sends from time to time the amount of information it has successfully received. Receiving an acknowledgement of byte number 3,000,000 at one time and an acknowledgement of byte number 3,250,000 twenty seconds later, would indicate that the device is receiving information at a rate of 12,500 Bytes per Second, which equals 100,000 Bits per Second (i.e. its incoming MCR is 100 kbps). In another example, as described above, an HTML browser would normally generate an HTTP request immediately upon receiving the first embedded image in an HTML page (e.g. using the HTML <img> tag). Receiving the HTTP request forty seconds after starting to send an HTML page in which the embedded image tag is located at offset 1,000,000 bytes, would indicate that the device is receiving information at a rate of 25,000 Bytes per Second, which equals 200,000 Bits per Second (i.e. its incoming MCR is 200 kbps). It should be noted that this measurement might be inaccurate since it compares the sending of the beginning of the HTML page to the receipt of the HTTP request, thereby adding at least one round trip time to the measurement. Measuring the round trip time and subtracting it from this time measurement may produce more accurate results.

RD 108 normally buffers relayed communications between MH 110 and ISD 104. Buffers are temporary storage into which RD 108 writes communications it receives, and from which RD 108 reads the communications it sends. When the buffers are not full, RD 108 can receive communications in its incoming MCR rate. When the buffers are full, RD 108 can receive communications at the rate it can empty the buffers (i.e. at the rate it can send communications out from the buffers). This means that a measurement of the communication rate from MH 110 to RD 108 would be an indication of RD 108's incoming MCR when the buffers are not full, and an indication of ISD 104's incoming MCR when the buffers become full. The buffers would become full if ISD 104's incoming MCR is smaller than RD 108's incoming MCR. For example, if RD 108 has buffers of size 100,000 bytes, and its incoming MCR is 1.5 Mbps, and ISD 104's incoming MCR is 96 kbps, then the buffers would be filled at a rate of 1.404 Mbps. It would take the buffers approximately 0.57 seconds to become full at this rate. In this example, a measurement of the communication rate during the first 0.57 seconds would be 1.5 Mbps, and this would be an indication of the RD 108's incoming MCR, and a measurement of the communication rate at any time after the first 0.57 seconds would be 96 kbps, and this would be an indication of the ISD 104's incoming MCR.

Therefore, in the case where PRD 150 is RD 108, the incoming MCR of PRD 150 is indicated by PRD 150's incoming communication rate before the buffer is full, and the incoming MCR of ISD 104 is indicated by PRD 150's incoming communication rate after the buffer is full.

In the case where PRD 150 is ISD 104 this buffer does not exist and PRD 150's incoming communication rate does not change, and remains equal to ISD 104's incoming MCR.

Therefore, PRD 150's incoming MCR is equal to PRD 150's incoming communication rate until the time it would take RD 108's buffers to be filled, and ISD 104's incoming MCR is equal to PRD 150's incoming communication rate thereafter.

RDS 102 can thus determine whether PRD 150 is a Relay Device 108 by comparing PRD 150's incoming communication rate at these two times.

In many cases, the communication rate from RD 108 to MH 110 does not exceed the ISD 104's outgoing MCR, because RD 108 would send to MH 110 only the information it receives from ISD 104, and would not normally generate significant amounts of information by itself. However since, as described above, RD 108 buffers communications between ISD 104 and MH 110, it is possible to measure the outgoing MCR of RD 108 as follows. Some protocols contain a 'flow control' mechanism, which allows a device receiving information to signal to a device sending the information when to stop sending new information and when to resume sending. For example, in TCP if a receiving device sends an ACK segment with a 'Window' value of zero, a sending device would normally stop sending new information, until it receives an ACK segment with a positive 'Window' value. A 'flow control' mechanism may be used by MH 110 or RDS 102 to signal to RD 108 to stop sending new information. This would cause RD 108's buffers to be filled by information, which RD 108 will continue to receive from ISD 104, and would not send to MH 110. MH 110 or RDS 102 would then use the 'flow control' mechanism to signal to RD 108 to resume sending new information. Since now RD 108 would send information from its local buffers, until the buffers will be empty, a measurement of the communication rate would be an indication of the outgoing MCR of RD 108.

According to some embodiments of the present invention, checking whether the MCR of ISD 104 is different than the MCR of PRD 150 is done by detecting an indication whether buffers in PRD 150 are being filled or emptied. For example, as described above, buffers in RD 108 would be filled if the incoming MCR of ISD 104 is smaller than the incoming MCR of PRD 150. In another example, as described above, buffers in RD 108 would be emptied if the outgoing MCR of ISD 104 is smaller than the outgoing MCR of PRD 150. Some protocols allow a device to advertise the capacity of its buffers, or a derivative thereof, to other devices it communicates with, and this information may be used to estimate whether a device's buffers are filling or becoming empty. For example, in TCP a device would advertise the amount of information it is willing to receive in the 'Window' header of every ACK segment it sends. Changes in the value of the 'Window' header normally reflect changes in the capacity of the device's buffer. An increase in the 'Window' value indicates the buffers are being emptied, while a decrease in the 'Window' value indicates the buffers are being filled.

Therefore, a decreasing 'Window' value is a direct indication that PRD 150's incoming MCR is larger than ISD 104's incoming MCR, meaning that PRD 150 and ISD 104 are distinct devices (i.e. PRD 150 is a Relay Device 108).

Another method of detecting an MCR is measuring the two latencies of two communications, which the only difference between them is the amount of information contained in each, and then calculating the MCR from the difference between the two latencies. As described above, the time it takes for a communication to be transferred over a communication line is proportional to the amount of information contained in the communication. Therefore, the MCR is equal to the difference between the amounts of information in the two communications, divided by the difference between the two latencies.

This method can also be used with RTT measurements, rather than latency. For example, the RTT of the ICMP echo mechanism, with a short Echo message (e.g. 64 bytes), and the RTT with a long Echo message (e.g. 1500 bytes), can be used to detect the device's MCR. It should be noted that if the incoming and outgoing communications contain the same amount of information, as in the ICMP echo example, the RTT method would provide a combined measurement of both the device's incoming and outgoing MCR. One method to overcome this limitation is to make RTT measurements using a protocol in which only one of the incoming and outgoing communications contain large amount of information. This would reduce the contribution of the other communication's latency to the RTT, and thus provide a better approximation of the latency of the first communication. For example, a TCP SYN segment sent to a closed port would normally trigger a segment containing the RST flag (RST segment). While the SYN segment can be of a size chosen by its sender, the RST segment would usually be small (e.g. 40 bytes).

Another method of detecting an MCR is to estimate if from other information known about the device. For example, finding the text 'dsl' in the reverse DNS of the device's IP address indicates it is likely a DSL line, which usually has an incoming MCR of 500-2,500 kbps and an outgoing MCR of 64-256 kbps. In another example, finding that the PRD 150's administrator is AOL indicates it is likely connected through a voice-modem dial-up line (since this is the primary connectivity option offered by AOL), which usually has an incoming MCR of up to 56 kbps and an outgoing MCR of up to 33 kbps.

Two Devices Using the Same Relay Device

In another particular embodiment of the present invention, RDS 102 detects that PRD 150 is a Relay Device 108 by determining that the original sources of two information elements are two different devices, without requiring that one of the original sources be the PRD 150.

In this embodiment RDS 102 attempts to distinguish between the following two cases:

FIG. 5A provides a diagram of the first case, in which ISD 104 sends two information elements, PRIE1 and PRIE2, directly to MH 110, without using RD 108. The two information elements are of a type that RD 108 may relay.

FIG. 5B provides a diagram of the second case, in which two different devices, ISD 104 and ISD2 106 each send an information element to MH 110, wherein both information elements are relayed by RD 108.

RDS 102 distinguishes between the two cases as follows:

RDS 102 monitors communications of MHI 110 and therefore receives from RD 108 two potentially relayed information elements (PRIE1 and PRIE2). RDS 102 then checks whether a feature (PRIE1-Feature) of an original source (PRIE2-Source) of PRIE1 and a feature (PRIE2-Feature) of an original source (PRIE2-Source) of PRIE2 are Incompatible Features. If indeed PRIE1-Feature and PRIE2-Feature are Incompatible Features, then it is more likely that the original source of PRIE1 and the source of PRIE2 are different devices, which means the second case is more likely, which means that PRIE1 and PRIE2 have likely been relayed.

For simplicity reasons, the description of this embodiment contains only three devices, two of which use a relay device. In practice, there are many devices connected to the Internet 100, and each of them may or may not use one of several relay devices that are also connected to the Internet 100. More generally, this embodiment detects that a potential relay device is a relay device by determining that at least two original sources of at least two potentially relayed information elements which were received from the potential relay device, have Incompatible Features. Since by definition a single device is not likely to have Incompatible Features, then it is likely that the two original sources are different devices, and therefore at least one of the sources is not the potential relay device, which means the information element from this source has been relayed and the potential relay device is a relay device.

All methods described above for determining whether features are Incompatible Features are also applicable for this embodiment, mutatis mutandis. For example, RDS 102 may compare the HTTP 'User-Agent' Headers provided in PRIE1 and PRIE2, and if they are indicative of different operating systems determine that ISD 104 and ISD2 106 are distinct devices and therefore PRD 150 is a Relay Device 108. In another example, RDS 102 may detect that the RTT of communications with PRIE1-Source and PRIE2-Source are significantly different. It should be noted, that in this case each RTT is the sum of (a) the RTT between RD 108 and MH 110, and (b) the RTT between each original source and RD 108. Therefore, the RTT gap in this case is a result of differences between (c) the RTT between PRIE1-Source and RD 108, and (d) the RTT between PRIE2-Source and RD 108. The two RTTs are not necessarily significantly different, but in some cases they may be, allowing RDS 102 to detect an RTT gap.

Ensuring Communications with an Original Source

In some embodiments of the present invention, information relating to features of devices is obtained from one or more new communications, and not from the original communication or communications that contained NRIE and/or PRIE. For such new communications to be usable, it should be verified that these are communications with the original source of the PRIE and/or NRIE.

US Published Patent Application 20040243832 the entirety of which is herein incorporated by reference, discloses several methods for determining that two network messages originated from the same sender. While these methods refer to messages rather than information elements or communications, and to senders rather than original sources, it will be appreciated by someone skilled in the art that most of the methods described therein are applicable to detecting that two information elements were sent by the same original source.

In one exemplary embodiment, ICMP packets and TCP/IP packets received with the same source IP address or sent to the same destination IP address could be considered as communications with the same device.

In another exemplary embodiment, incoming TCP/IP packets belonging to one TCP connection could be considered to come from the same device.

In another exemplary embodiment, an HTTP response sent following an HTTP request, in accordance with the HTTP protocol could be considered as a communication with the source of the HTTP request.

The System

Figure 3:
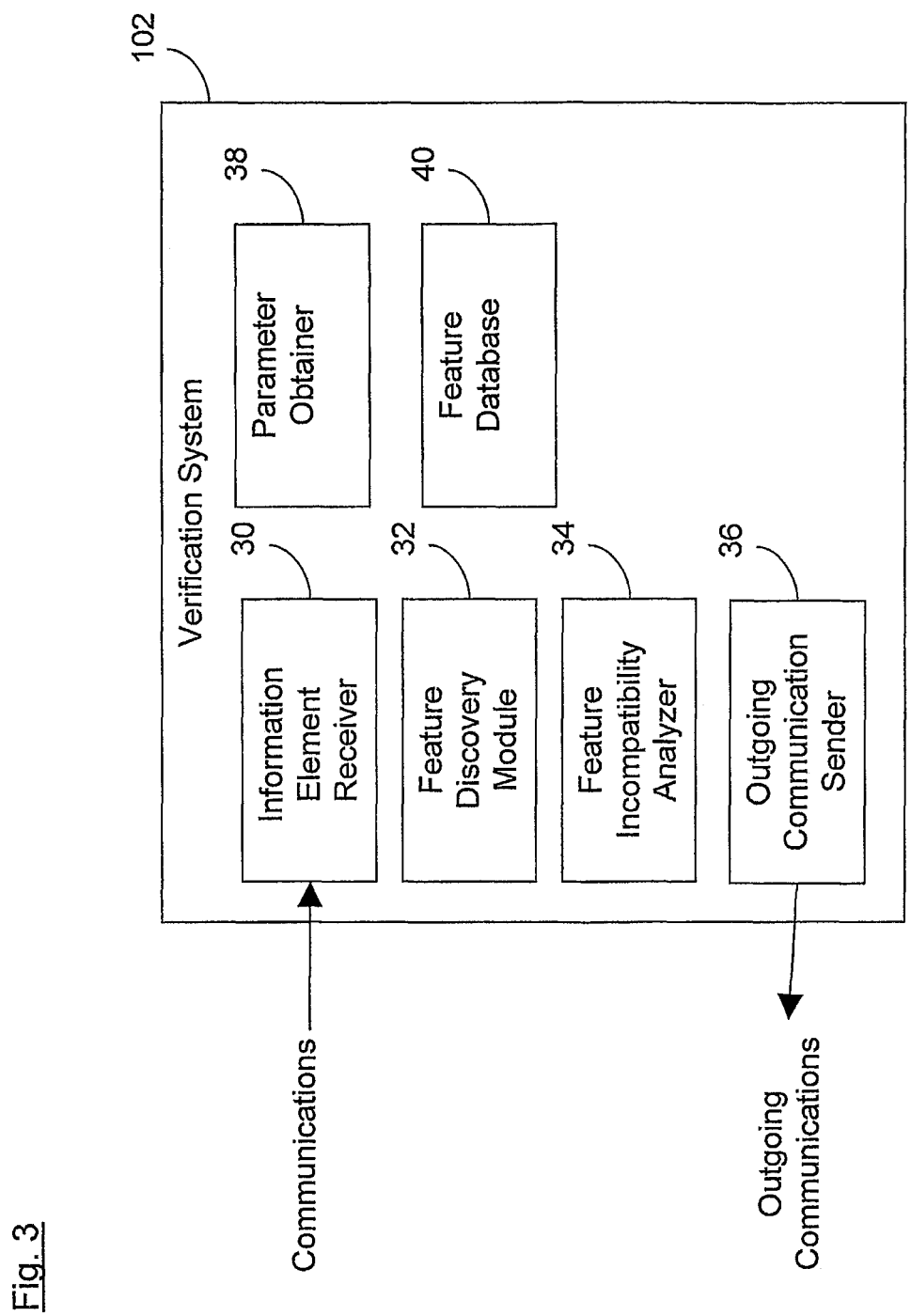
FIG. 3 provides a description of a system according to several embodiments of the present invention.

FIG. 3 describes the components of the Relay Detection System 102 in accordance with a particular embodiment of the present invention.

An Information Element Receiver 30 monitors communications that MH 110 receives. It potentially also monitors communications that MH 110 sends. It potentially also monitors communications that Outgoing Communication Sender 36 sends.

A Feature Incompatibility Analyzer 34 determines whether ISD-Feature and PRD-Feature are Incompatible Features.

An optional Feature Discovery Module 32 discovers the ISD-Feature and/or the PRD-Feature.

An optional Outgoing Communication Sender 36 sends one or more Outgoing Communications.

An optional Parameter Obtainer 38 obtains one or more parameters indicative of (a) the ISD-Feature, (b) the PRD-Feature and/or (c) whether ISD-Feature and PRD-Feature are Incompatible Features.

An optional Feature Database 40 contains a list of pairs of features and whether they are Incompatible Features. For example, the Feature Database 40 may contain a description of which HTML clients are supported by each operating system.

Miscellaneous

It is to be understood that according to some embodiments, the present invention provides for using any combination of features or parameters disclosed in the present document to be useful for determining if a potential relay device is a relay device and/or for determining if received information elements were relayed by a relay device.

In some embodiments described above ISD-Feature and/or PRD-Feature were related to latency and/or to communication rate. It will be appreciated by someone skilled in the art that these are specific cases of the more general case in which ISD-Feature and/or PRD-Feature are related to communication performance. 'Communication performance' is a general term referring to all the parameters describing the speed, rate, time, efficiency etc. of a communication.

In determining whether two features are Incompatible Features, RDS 102 should consider the time at which each of the features was discovered. For example, if the two features are wall clock configurations equal to 9:05 am and 10:05 am, and the second feature was discovered exactly one hour after the first, then the two features could not be considered Incompatible Features, because the difference in time of discovery directly explains the difference in the features. However, if the same two features were discovered at approximately the same time, they could be considered Incompatible Features. In another example, if one feature is an RTT measurement of 900 milliseconds and the other feature is an RTT of 940 milliseconds, and the first feature was discovered 24 hours after the other, then the features are not necessarily Incompatible Features, because network topology changes may account for this difference. However, if the same two features were discovered during the same 100 millisecond period, the likelihood of topology changes is smaller, and thus the features are more likely to be Incompatible Features.

If the features were discovered at nearly the same time, then RDS 102 should consider whether these features are unlikely to concurrently relate to the same device.

The numerous innovative teachings of the present application are described with particular reference to a presently disclosed embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

According to some embodiments, the term "unlikely" as used herein refers to a probability at most 40%.

In other embodiments, this probability is at most 30%.
In other embodiments, this probability is at most 20%.
In other embodiments, this probability is at most 10%.
In other embodiments, this probability is at most 5%.
In other embodiments, this probability is at most 1%.
In other embodiments, this probability is at most 1/2%.

Similarly, a "likely" event is an event that occurs with a probability of 100% minus the probability of the "unlikely" event.

According to some embodiments, a "single" device is physically one device. Nevertheless, it is recognized in the art that electronic devices connected to data networks such as relay devices, monitored hosts and information source devices are often a cluster of several physically different devices logically configured to present themselves to a data network and/or devices on the data network as a "single" device. Thus, as used herein, a "single" device refers both to a single physical device as well as a plurality of physical devices logically configured to present themselves as a single device.

According to some embodiments, locations that are "different" as used herein refers to places located in different countries.

According to some embodiments, locations that are "different" as used herein refers to places located in different states.

According to some embodiments, locations that are "different" as used herein refers to places located in different provinces.

According to some embodiments, locations that are "different" as used herein refers to places located in different continents.

According to some embodiments, locations that are "different" as used herein refers to places located in different time zones.

According to some embodiments, locations that are "different" as used herein refers to location separated by a minimum of 100 kilometers, or by a minimum of 200 kilometers, or by a minimum of 1000 kilometers, or by a minimum of 2500 kilometers.

What is claimed is:

1. A system, comprising:
one or more processors, one or more computer-readable memories, with program instructions stored on the one or more computer-readable memories, the one or more processors configured to execute the program instructions to cause the system to perform operations comprising:
receiving a communication from a device, the communication including first device information for the device and second device information for a source device of the communication;
determining that the first device information and the second device information are incompatible;
in response to the determining that the first device information and the second device information are incompatible, determining a first latency of a first communication for the device based on the first device information;
determining a second latency of a second communication for the source device based on the second device information;
determining a maximum communication rate of the device and the source device based at least on the first communication and the second communication; and
determining that the device is a relay device based at least on the determining that the first device information and the second device information are incompatible, the first and second latencies, and the maximum communication rate.

2. The system of claim 1, wherein the first device information corresponds to a first operating system and the second device information corresponds to a second operating system.

3. The system of claim 1, wherein the first device information corresponds to a first location and the second device information corresponds to a second location.

4. The system of claim 3, wherein the operations further comprise:
determining that the first device information corresponds to the first location using internet protocol (IP) address information associated with the communication from an IP database; and
determining that the second device information corresponds to the second location includes analyzing location information in a header of the communication.

5. The system of claim 1, wherein the first device information corresponds to a first sub-network and the second device information corresponds to a second sub-network.

6. The system of claim 1, wherein the first device information corresponds to a first administrator and the second device information corresponds to a second administrator.

7. The system of claim 6, wherein the operations further comprise:
determining that the first device information corresponds to the first administrator using internet protocol (IP) address information associated with the communication from an IP database; and
determining that the second device information corresponds to the second administrator includes analyzing administrator information in a header of the communication.

8. A method comprising:
receiving, by one or more processors, a communication from a device, the communication including first device information for the device and second device information for a source device of the communication;
determining, by one or more processors, that the first device information and the second device information are incompatible;
in response to the determining that the first device information and the second device information are incompatible, determining a first latency of a first communication for the device based on the first device information;
determining a second latency of a second communication for the source device based on the second device information;
determining a maximum communication rate of the device and the source device based at least on the first communication and the second communication; and determining, by one or more processors, that the device is a relay device based at least on the determining that the first device information and the second device information are incompatible, the first and second latencies, and the maximum communication rate second.

9. The method of claim 8, wherein the first device information corresponds to a first operating system and the second device information corresponds to a second operating system.

10. The method of claim 8, wherein the first device information corresponds to a first location and the second device information corresponds to a second location.

11. The method of claim 10, further comprising:
determining that the first device information corresponds to the first location using internet protocol (IP) address information associated with the communication with an IP database; and
determining that the second device information corresponds to the second location includes analyzing location information in a header of the communication.

12. The method of claim 8, wherein the first device information corresponds to a first sub-network and the second device information corresponds to a second sub-network.

13. The method of claim 8, wherein the first device information corresponds to a first administrator and the second device information corresponds to a second administrator.

14. The method of claim 13, further comprising:
determining that the first device information corresponds to the first administrator using internet protocol (IP) address information associated with the communication with an IP database; and
determining that the second device information corresponds to the second administrator includes analyzing administrator information in a header of the communication.

15. A computer program product comprising:
one or more computer-readable tangible storage devices, and program instructions stored on at least one of the one or more storage devices, the program instructions when executed cause a machine to perform operations comprising:
receiving a communication from a device, the communication including first device information for the device and second device information for a source device of the communication;
determining that the first device information and the second device information are incompatible;
in response to determining that the first device information and the second device information are incompatible, determining a first latency of a first communication for the device based on the first device information;
determining a second latency of a second communication for the source device based on the second device information;
determining a maximum communication rate of the device and the source device based at least on the first communication and the second communication; and
determining that the device is a relay device based at least on the determining that the first device information and the second device information are incompatible, the first and second latencies, and the maximum communication rate.

16. The computer program product of claim 15, wherein the first device information corresponds to a first operating system and the second device information corresponds to a second operating system.

17. The computer program product of claim 15, wherein the first device information corresponds to a first location and the second device information corresponds to a second location.

18. The computer program product of claim 17, wherein the operations further comprise:
determining that the first device information corresponds to the first location using internet protocol (IP) address information associated with the communication with an IP database; and
determining that the second device information corresponds to the second location includes analyzing location information in a header of the communication.

19. The computer program product of claim 15, wherein the first device information corresponds to a first sub-network and the second device information corresponds to a second sub-network.

20. The computer program product of claim 15, wherein the first device information corresponds to a first administrator and the second device information corresponds to a second administrator.

* * * * *

UNITED STATES PATENT AND TRADEMARK OFFICE
CERTIFICATE OF CORRECTION

PATENT NO. : 10,798,055 B2  
APPLICATION NO. : 16/182555  
DATED : October 6, 2020  
INVENTOR(S) : Saar Wilf and Shvat Shaked Page 1 of 1

It is certified that error appears in the above-identified patent and that said Letters Patent is hereby corrected as shown below:

In the Specification

In the Detailed Description:

In Column 17, Line 14, change "MR 110" to --MH 110--

In Column 17, Line 21, change "MR 110" to --MH 110--

In the Claims

In Column 29, Line 5, Claim 8: change "communication rate second" to --communication rate--

Signed and Sealed this  
Twenty-ninth Day of June, 2021

Drew Hirshfeld  
*Performing the Functions and Duties of the*  
*Under Secretary of Commerce for Intellectual Property and*  
*Director of the United States Patent and Trademark Office*